United States Patent
Zou et al.

(10) Patent No.: US 10,172,193 B2
(45) Date of Patent: Jan. 1, 2019

(54) DC POWER SUPPLY AND ITS LED LAMP AND CONTROL SYSTEM

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Xuejun Zou, Zhejiang (CN); Xiaoyong Zhou, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/949,668

(22) Filed: Apr. 10, 2018

(65) Prior Publication Data

US 2018/0310371 A1 Oct. 25, 2018

(30) Foreign Application Priority Data

Apr. 19, 2017 (CN) .......................... 2017 1 0256019

(51) Int. Cl.
*H05B 37/02* (2006.01)
*H05B 33/08* (2006.01)
(Continued)

(52) U.S. Cl.
CPC .......... *H05B 33/0809* (2013.01); *H02M 7/44* (2013.01); *H02M 7/53871* (2013.01);
(Continued)

(58) Field of Classification Search
None
See application file for complete search history.

(56) References Cited

U.S. PATENT DOCUMENTS

| 9,459,674 | B2* | 10/2016 | Lin | G06F 1/263 |
| 2014/0143571 | A1* | 5/2014 | Lin | G06F 1/263 |
| | | | | 713/323 |
| 2017/0374719 | A1* | 12/2017 | Zhou | H05B 33/0884 |

* cited by examiner

*Primary Examiner* — Vibol Tan
(74) *Attorney, Agent, or Firm* — Wang Law Firm, Inc.

(57) ABSTRACT

A DC power supply for preventing output from being misconnected to a power supply and its LED lamp and control system, comprise a DC power supply and an anti-misconnection module. The DC power supply comprises a positive output terminal and a negative output terminal. The anti-misconnection module comprises a positive access terminal and a negative access terminal which are electrically connected to the positive and negative output terminals of the DC power supply respectively, a NMOS transistor controlling on-off of the negative access terminal, a load access unit performing a turn-on operation of the NMOS transistor, a forward-blocking unit performing a turn-off operation of the NMOS transistor, and a backward access unit performing a turn-off operation of the NMOS transistor. The present invention prevents the DC power supply from being damaged even if the positive access terminal and the negative access terminal of the DC power supply are misconnected to the external power supply, such as the electric supply or the dry battery. As long as the external power supply is removed and the normal load is connected, such as LED lamps, the DC power supply of the present invention can work normally, so that it can not only improve the reliability of power supply products, but also can reduce the corresponding maintenance workload.

10 Claims, 3 Drawing Sheets

(51) Int. Cl.
*H02M 1/00* (2006.01)
*H02M 7/5387* (2007.01)
*H02M 7/44* (2006.01)
(52) U.S. Cl.
CPC ....... *H05B 33/089* (2013.01); *H05B 33/0845* (2013.01); *H05B 33/0851* (2013.01); *H05B 33/0854* (2013.01); *H05B 33/0884* (2013.01); *H05B 37/0209* (2013.01); *H05B 37/0227* (2013.01); *H05B 37/0272* (2013.01)

DC POWER SUPPLY AND ITS LED LAMP AND CONTROL SYSTEM

CROSS-REFERENCE TO A RELATED APPLICATION

This application claims priority to a Chinese Patent Application No. CN 201710256019.6, filed on Apr. 19, 2017.

FIELD OF THE TECHNOLOGY

The present invention relates to to a power supply device for a lighting device, with particular emphasis on a DC power supply for preventing output from being misconnected to a power supply and its LED lamp and control system.

BACKGROUND

With the concept of "humanized lighting" deeply rooted in the hearts of people, the lighting design should create a good indoor lighting effect to meet people's physiological and psychological needs. Now more and more lighting design uses LED lamps, and at the same time LED lamps also begin to replace the original ordinary lamps, such as fluorescent lamps, halogen lamps, fluorescent lamps and so on. But because of its characteristics LED lamps, people must convert electric supply to low voltage DC current. Therefore, the assembly of the entire LED lamps often include DC power and LED lamps. As quality of life becomes higher and higher, controllers may sometimes be added between the DC power supply and the LED lamp to complicate the installation of the entire LED lamp.

These DC power supply output voltage is usually low, the output is difficult with the sustained high pressure during the installation of the project or during the test, the input and output are occasionally reversed, the output is wrongly connected to the high voltage mains. At this time, the DC power supply is damaged, and uncontrolled high current flows through the components in the power supply, which may cause fire accidents.

SUMMARY OF THE INVENTION

Therefore, the present invention provides a DC power supply for preventing output from being misconnected to a power supply and its LED lamp and control system to solve the above problem.

A DC power supply for preventing output from being misconnected to a power supply, comprising: a DC power supply comprised of a positive output terminal and a negative output terminal, and a anti-misconnection module electrically connected to the DC power supply wherein the anti-misconnection module comprises a positive access terminal and a negative access terminal which are electrically connected to the positive and negative output terminals of the DC power supply respectively, a NMOS transistor controlling on-off of the negative access terminal, a load access unit performing a turn-on operation of the NMOS transistor, a forward blocking unit performing a turn-off operation of the NMOS transistor, and a backward access unit performing a turn-off operation of the NMOS transistor, the source electrode and the drain electrode of the NMOS transistor being connected in series at the negative access terminal, the load access unit being electrically connected between the positive output terminal and the gate of the NMOS transistor wherein the load access unit comprises a diode D1 connected in series between the positive output terminal and the gate of the NMOS transistor wherein the cathode of the diode D1 is connected to the gate of the NMOS transistor, the forward blocking unit comprising a diode D2 connected in series between the positive output terminal and the positive access terminal and a diode D3 connected in series between the positive access terminal and the gate of the NMOS transistor wherein the cathode of the diode D2 is electrically connected to the positive access terminal and the cathode of the diode D3 is electrically connected to the positive access terminal, the backward access unit comprising a diode D4 connected between the gate and the source electrode of the NMOS transistor, a zener diode D5 connected in series between the negative input terminal and the gate of the NMOS transistor and a transistor Q1 wherein the cathode of the diode D4 is electrically connected to the gate of the NMOS transistor and the cathode of the zener diode D5 is connected to the negative input terminal, the base of the transistor Q1 is connected to the anode of the diode D5, the collector of the transistor Q1 thereof is connected to the gate of the NMOS transistor and the emitter of the transistor Q1 is connected to the source electrode of the NMOS transistor and the negative output terminal of the DC power supply.

Further, the load access unit further comprises a capacitor connected between the gate and the source electrode of the NMOS transistor.

Further, the load access unit further comprises a current limiting resistor R1 connected between the cathode of the diode D1 and the gate of the NMOS transistor.

Further, the forward blocking unit further comprises a divider resistor R4 connected in series between the positive input terminal and the diode D3.

Further, the backward access unit further comprises a current limiting resistor R3 connected in series between the negative input terminal and the diode D5.

Further, the diode D4 is a zener diode.

An LED lamp, comprising: a DC power supply for preventing output from being misconnected to a power supply as described above, and at least one LED light connected to the positive and negative access terminal of the DC power supply for preventing output from being misconnected to a power supply.

Further, the LED lamp comprises a plurality of LED lamps connected in series to the positive access terminal and negative terminal of the DC power supply for preventing output from being misconnected to a power supply.

A control system, comprising: a DC power supply for preventing output from being misconnected to a power supply as described above, and at least one controller connected to the positive and negative access terminal of the DC power supply for preventing output from being misconnected to a power supply wherein the DC power supply provides power to the at least one controller.

Further, the control system comprises a plurality of controllers connected in parallel to the positive access terminal and the negative access terminal of the DC power supply for preventing output from being misconnected to a power supply.

Compared with the prior art, the present invention prevents the DC power supply from being damaged even if the positive access terminal and the negative access terminal of the DC power supply are misconnected to the external power supply, such as the electric supply or the dry battery. As long as the external power supply is removed and the normal load is connected, such as LED lamps, the DC power supply of the present invention can work normally, so that it can not only improve the reliability of power supply products, but also can reduce the corresponding maintenance workload.

DETAILED DESCRIPTION OF THE DRAWINGS

The drawings described herein are intended to promote a further understanding of the present invention, as follows.

DESCRIPTION OF THE PREFERRED EMBODIMENTS

The present application is illustrated by way of the following detailed description based on of the accompanying drawings. It should be noted that illustration to the embodiment in this application is not intended to limit the invention.

Figure 1:
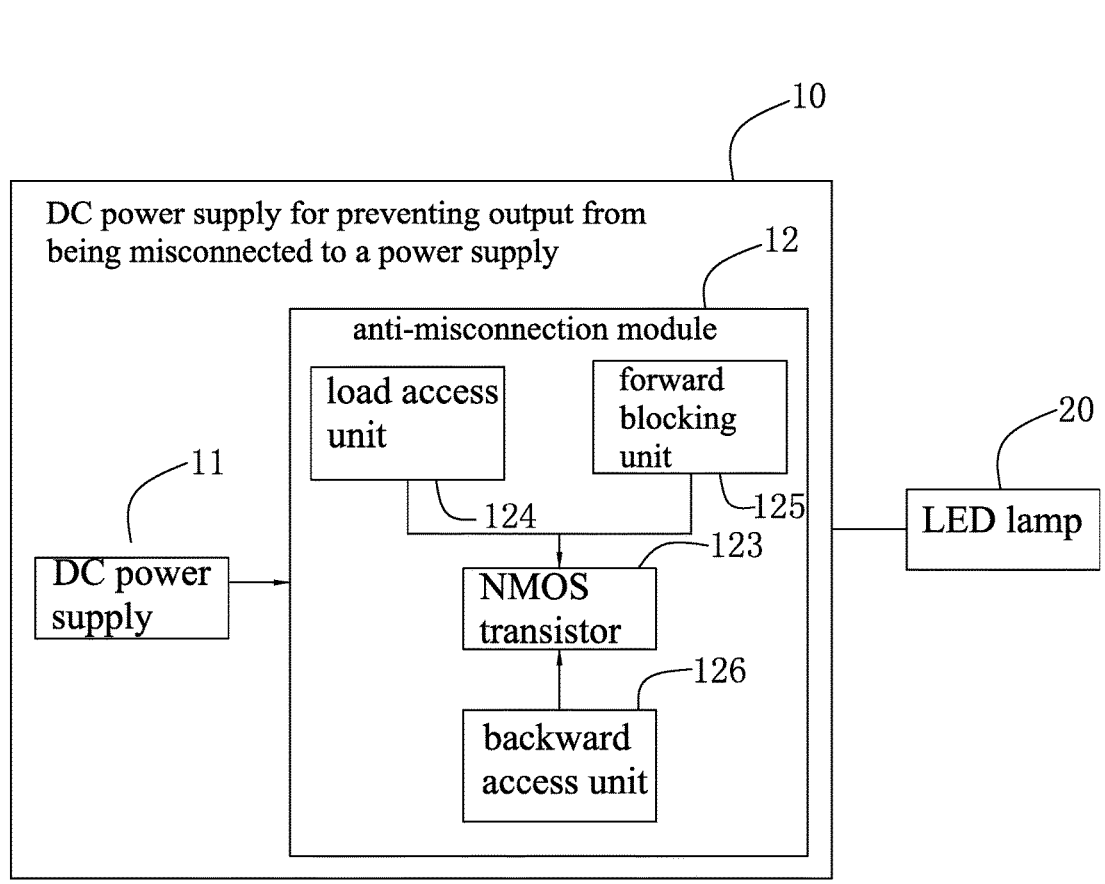
FIG. 1 is a schematic block diagram of an LED lamp according to a first embodiment of the present invention.
Figure 2:
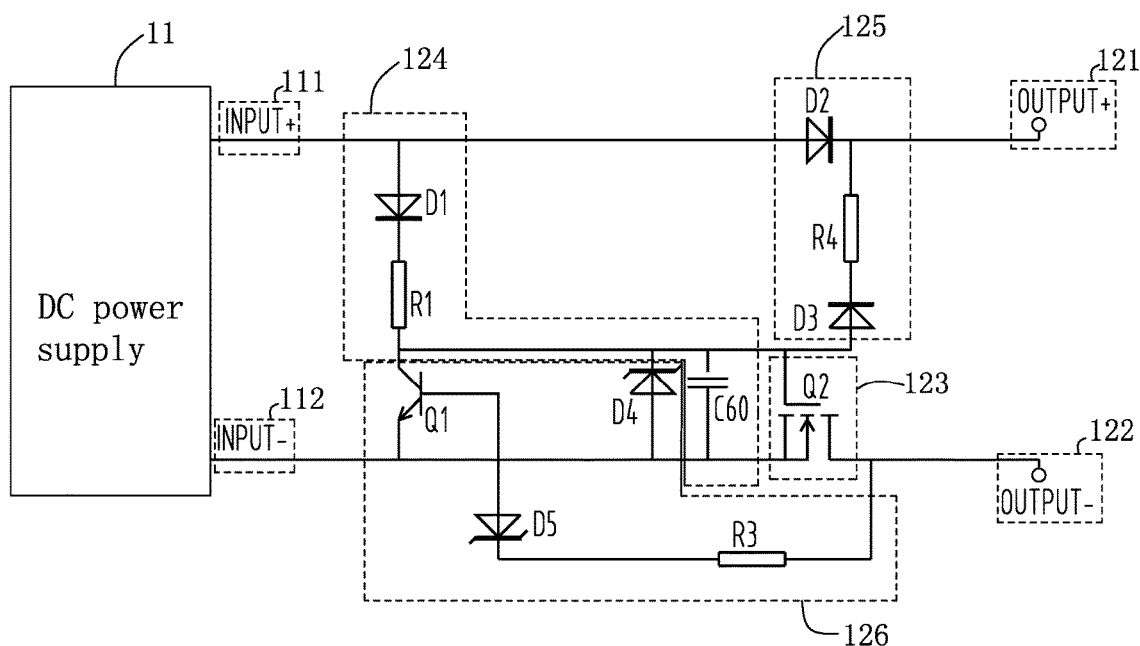
FIG. 2 is a circuit diagram of the LED lamp of FIG. 1.

Please referring to FIG. 1 to FIG. 2, the LED lamp 100 comprises a DC power supply 10 for preventing output from being misconnected to a power supply and at least one LED lamp 20. It is conceivable that the LED lamp 100 only shows a circuit diagram in this embodiment, and hardware such as a chip, a circuit board and a lamp housing are not described in this embodiment, and are known to those skilled in the art. In addition, it can be understood that the LED lamp 100 further comprises other functional circuit modules such as a dimming module, a control module and the like, which are technologies known to those skilled in the art and will not be described in detail.

The function of the DC power supply 10 for preventing output from being misconnected to a power supply is to prevent the DC source 10 from being burned when the output terminal of the DC source 10 should be connected to the load but wrongly connected with the AC source or the DC source such as electric supply or dry battery. The DC power supply 10 for preventing output from being misconnected to a power supply comprises a DC power supply 11 and a anti-misconnection module 12 electrically connected to an output terminal of the DC power supply. The DC power supply 11 is used for converting electric supply into a low-voltage DC power suitable for the LED lamp 20. As shown in FIG. 1, the DC power supply 11 comprises an AC/DC module that converts alternating current into direct current. Of course, it is also conceivable that the DC power supply 11 further comprises other modules such as a transformer, a feedback module, a rectifier filter module, and the like, which provides the compliance current of the DC power supply 10 for supplying power to the LED lamp 20. The DC power supply 11 has a positive output 111 and a negative output 112. The positive and negative output terminals 111 and 112 of the DC power supply 11 are used for connecting other function modules or loads, such as a DALI controller, and also an LED lamp. In the present invention, the positive and negative output terminals 111 and 112 of the DC power supply 11 are connected to the anti-misconnection module 12.

The anti-misconnection module comprises a positive access terminal 121 and a negative access terminal 122 which are electrically connected to the positive and negative output terminals 111, 112 of the DC power supply 11 respectively, a NMOS transistor 123 controlling on-off of the negative access terminal 124, a forward blocking unit 125 performing a turn-off operation of the NMOS transistor 123, and a backward access unit 126 performing a turn-off operation of the NMOS transistor 123.

The NMOS transistor 123, as a prior art general electronic component, will not be described in detail for its technical specifications and structure, which is a well known in the art. Therefore, the NMOS transistor is an N-channel MOS transistor, and having three terminals, i.e., a drain, a source, and a gate should also be well-known to those skilled in the art. n the present invention, the source and the drain of the NMOS transistor 123 are connected in series to the negative access terminal 122, and are used to cut off the negative access terminal 122 when the positive access terminal 121 and the negative access terminal 122 aren't connected with the load or DALI circuit so as to prevent the DC power supply 11 from being damaged.

The load access unit 124 is configured to turn on the NMOS transistor to connect the positive access terminal 121 when the positive access terminal 121 and the negative access terminal 122 are connected with the load or DALI circuit instead of a power supply such as a electric supply or a dry battery. So the DC power supply 11 and the anti-misconnection module 12 can have a normal output. The load access unit 124 is electrically connected between the positive output terminal 121 and the gate of the NMOS transistor 123 wherein the load access unit 123 comprises a diode D1 connected in series between the positive output terminal 121 and the gate of the NMOS transistor 123 wherein the cathode of the diode D1 is connected to the gate of the NMOS transistor 123. At the same time, the load access unit 124 further comprises a current limiting resistor R1 connected between the cathode of the diode D1 and the gate of the NMOS transistor 123 in order to apply a different input voltage of the misconnected power supply. In order to ensure that the NMOS transistor 123 can be turned on during normal access, the load access unit 124 further comprises a capacitor C60 connected between the gate and the source of the NMOS transistor 123. The capacitor C60 is charged during normal operation, so that a bias voltage is applied to the gate and the source of the NMOS transistor 123. Even though the voltage of the gate and source of the NMOS transistor 123 is smaller due to the current limiting resistor R1, the NMOS transistor 123 is also turned on so that the output voltage of the DC power supply 11 can be loaded into a load of a LED lamp or a controller such as a DALI during normal access.

The forward blocking unit 125 is configured to prevent the voltage drop at the high level from flowing into the DC power supply when the positive access terminal 121 is misconnected to the high level and the negative access terminal 122 is misconnected to the low level, the forward blocking unit 125 is described to prevent the DC power supply 11 from being damaged by the voltage of the power supply such as the electric supply or the dry battery being loaded on the DC power supply 11. The forward blocking unit 125 comprises a diode D2 connected in series between the positive output terminal 111 and the positive access terminal 121 and a diode D3 connected in series between the positive access terminal 121 and the gate of the NMOS transistor 123. The cathode of the diode D2 is electrically connected to the positive access terminal 121 and the cathode of the diode D3 is electrically connected to the positive access terminal 121. At the same time, the forward blocking unit 124 further comprises a current limiting resistor R4 connected between the cathode of the diode D3 and the gate of the positive input terminal 121 in order to apply a different input voltage of the misconnected power supply.

When the positive access terminal 121 is connected to the high level of the power supply, due to the presence of the diode D2 and the diode D3, the current flow is blocked, that is, the bias voltage is prevented from being applied to the NMOS transistor 123 to be turned on. Even though the DC power supply 11 is in normal operation, the load access unit 124 turns on the NMOS transistor 123. However, due to the presence of the diode D2 and the diode D3, the input voltage of the misconnected power supply is also difficult to be loaded on the DC power supply 11, so that the DC power supply 11 can be prevented from being damaged.

The backward access unit 126 is configured to cut off the NMOS transistor 123 when the positive access terminal 121 is misconnected to the low level and the negative access terminal 122 is misconnected to the high level, the backward access unit 126 is described to prevent the DC power supply 11 from being damaged by the voltage of the power supply such as the electric supply or the dry battery being loaded on the DC power supply 11. The backward access unit 126 comprises a diode D4 connected between the gate and the source electrode of the NMOS transistor 123, a zener diode D5 connected in series between the negative input terminal 122 and the gate of the NMOS transistor and a transistor Q1 wherein the cathode of the diode D4 is electrically connected to the gate of the NMOS transistor and the cathode of the zener diode D5 is connected to the negative input terminal 122, the base of the transistor Q1 is connected to the anode of the diode D5, the collector of the transistor Q1 thereof is connected to the gate of the NMOS transistor and the emitter of the transistor Q1 is connected to the source electrode of the NMOS transistor. When the positive access terminal 121 is connected to the low level and the positive access terminal 122 is connected to the high level, two situations exist: one is that the direct current power supply 11 is in the power-on working state, another is that the DC power supply 11 is not in the power-on working state. When the DC power supply 11 is in the power-on working state, the negative input terminal 122 is misconnected to a high level, and the NMOS transistor 123 is in an on state, the current loaded on the negative input terminal 122 firstly flow through the NMOS transistor 123 so that the power of the capacitor C60 or the power between the source and the gate of the NMOS transistor 123 will be released, the NMOS transistor is cut off while the Zener diode D5 is broken down, so that the transistor Q1 is turned on. The voltage drop at the negative input terminal 122 will flow through the BE electrode of the transistor Q1, and then flows through the diode D4. Finally, the gate of the NMOS transistor 123 and the diode D3 flow into the positive input terminal 121 to form a loop. Therefore, as long as the power supply on the negative access terminal 122 is not released, the NMOS transistor 123 will always cut off, and the misconnected current will not flow into the DC power supply 11 any more, the DC power supply 11 will be damaged. At the same time, when the voltage drop on the negative terminal 122 flows through the diode D4 and the transistor Q1 is turned on, the current of the DC power supply 11 passes through the diode D1 and the CE of the transistor Q1 and flows back to the negative output terminal 112 of the DC power supply 11.

In another case, when the DC power supply 11 is not in the power-on working state, the NMOS transistor 123 itself will be in an off state. When the negative input terminal 122 is incorrectly connected to a high level, the Zener diode D5 is broken down so that the transistor Q1 is turned on. The voltage drop at the negative terminal 122 flows through the BE pole of the transistor Q1, and then flows through the diode D4. Finally, the gate of the NMOS transistor 123 and the diode D3 flows into the positive access terminal 121 to form a loop. Therefore, the high level of the erroneous access to the negative input terminal does not flow into the DC power supply 11, so that the DC power supply 11 can't be damaged. At the same time, the backward access unit 126 further comprises a current limiting resistor R3 connected between the cathode of the zener diode D5 and the negative input terminal 122 for applying different input voltages of misconnected power supplies.

The LED lamp 20 is a lighting device known to those skilled in the art and comprises an LED chip. Because of the characteristics of the LED chip itself, the power used by the LED lamp 20 must be low-voltage DC power.

Compared with the prior art, the present invention prevents the DC power supply from being damaged even if the positive access terminal because the DC power supply comprises the load access unit 124, the forward blocking unit 125, and the backward access unit 126 and the negative access terminal of the DC power supply are misconnected to the external power supply, such as the electric supply or the dry battery. As long as the external power supply is removed and the normal load is connected, such as LED lamps, the DC power supply of the present invention can work normally, so that it can not only improve the reliability of power supply products, but also can reduce the corresponding maintenance workload.

Figure 3:
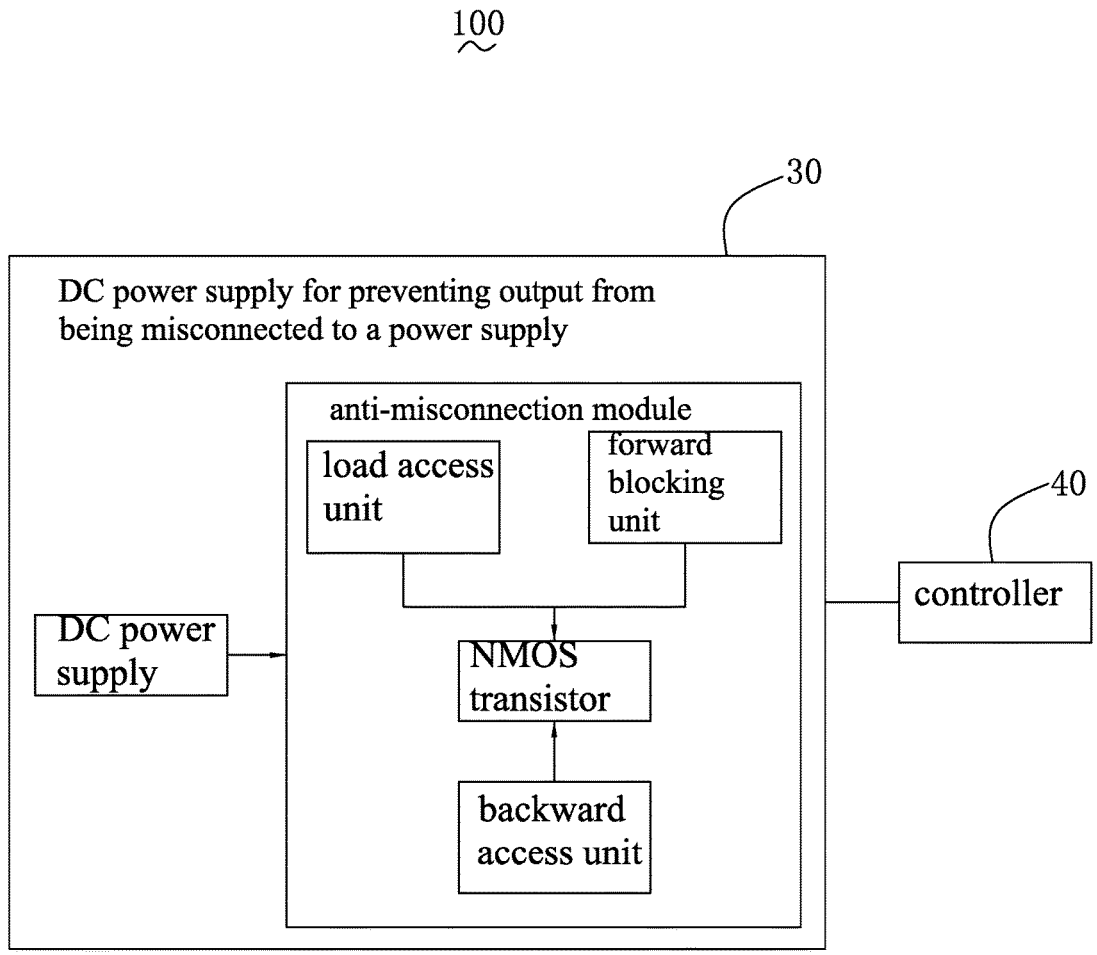
FIG. 3 is a schematic block diagram of a control system according to a second embodiment of the present invention.

FIG. 3 is a schematic block diagram of a control system according to a second embodiment of the present invention. The control system 200 comprises a DC power supply 30 preventing output from being misconnected to a power supply and at least one controller 40 connected to the DC power supply 30. The DC power supply 30 is configured to provide power to the at least one controller 40.

Compared the DC power supply 30 for preventing output from being misconnected to a power supply and the DC power supply 10 of the first embodiment, the circuit structure and operation principle of the DC power supply 30 are the same, except that in the first embodiment, the load connected to the positive input terminal 121 and the negative input terminal 121 of the direct current power supply 10 is the LED lamp 20. In the present embodiment, the load connected to the direct current power supply 30 for preventing output from being misconnected to a power supply is the controller 40. In the present embodiment, the control system 200 comprises a plurality of controllers 40. The plurality of controllers 40 are connected in parallel to the positive and negative access terminals of the DC output power source 30, and the DC power supply 30 provides energy. The controller may be a DALI controller or a 2.4G controller or the like, which is well known to those skilled in the art.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A DC power supply for preventing output from being misconnected to a power supply, comprising:
    a DC power supply comprised of a positive output terminal and a negative output terminal, and an anti-misconnection module electrically connected to the DC power supply wherein the anti-misconnection module comprises a positive access terminal and a negative access terminal which are electrically connected to the positive and negative output terminals of the DC power supply respectively, a NMOS transistor controlling on-off of the negative access terminal, a load access unit performing a turn-on operation of the NMOS transistor, a forward blocking unit performing a turn-off operation of the NMOS transistor, and a backward access unit performing a turn-off operation of the NMOS transistor, the source electrode and the drain electrode of the NMOS transistor being connected in series at the negative access terminal, the load access unit being electrically connected between the positive output terminal and the gate of the NMOS transistor wherein the load access unit comprises a diode D1 connected in series between the positive output terminal and the gate of the NMOS transistor wherein the cathode of the diode D1 is connected to the gate of the NMOS transistor, the forward blocking unit comprising a diode D2 connected in series between the positive output terminal and the positive access terminal and a diode D3 connected in series between the positive access terminal and the gate of the NMOS transistor wherein the cathode of the diode D2 is electrically connected to the positive access terminal and the cathode of the diode D3 is electrically connected to the positive access terminal, the backward access unit comprising a diode D4 connected between the gate and the source electrode of the NMOS transistor, a zener diode D5 connected in series between the negative input terminal and the gate of the NMOS transistor and a transistor Q1 wherein the cathode of the diode D4 is electrically connected to the gate of the NMOS transistor and the cathode of the zener diode D5 is connected to the negative input terminal, the base of the transistor Q1 is connected to the anode of the diode D5, the collector of the transistor Q1 thereof is connected to the gate of the NMOS transistor and the emitter of the transistor Q1 is connected to the source electrode of the NMOS transistor and the negative output terminal of the DC power supply.

2. The DC power supply as claimed in claim 1, wherein the load access unit further comprises a capacitor connected between the gate and the source electrode of the NMOS transistor.

3. The DC power supply as claimed in claim 1, wherein the load access unit further comprises a current limiting resistor R1 connected between the cathode of the diode D1 and the gate of the NMOS transistor.

4. The DC power supply as claimed in claim 1, wherein the forward blocking unit further comprises a divider resistor R4 connected in series between the positive input terminal and the diode D3.

5. The DC power supply as claimed in claim 1, wherein the backward access unit further comprises a current limiting resistor R3 connected in series between the negative input terminal and the diode D5.

6. The DC power supply as claimed in claim 1, wherein the diode D4 is a zener diode.

7. An LED lamp, comprising:
a DC power supply for preventing output from being misconnected to a power supply according to claim 1,
and at least one LED light connected to the positive and negative access terminal of the DC power supply for preventing output from being misconnected to a power supply.

8. The LED lamp as claimed in claim 7, wherein the LED lamp comprises a plurality of LED lamps connected in series to the positive access terminal and negative terminal of the DC power supply for preventing output from being misconnected to a power supply.

9. A control system, comprising:
a DC power supply for preventing output from being misconnected to a power supply according to claim 1,
and at least one controller connected to the positive and negative access terminal of the DC power supply for preventing output from being misconnected to a power supply wherein the DC power supply provides power to the at least one controller.

10. The control system as claimed in claim 9, wherein the control system comprises a plurality of controllers connected in parallel to the positive access terminal and the negative access terminal of the DC power supply for preventing output from being misconnected to a power supply.

* * * * *